United States Patent [19]
Englefield

[11] Patent Number: 5,896,491
[45] Date of Patent: Apr. 20, 1999

[54] SYSTEM AND METHOD FOR EXECUTING FUNCTIONS ASSOCIATED WITH FUNCTION ICONS

[75] Inventor: Paul Jonathan Englefield, Leamington Spa, United Kingdom

[73] Assignee: International Business Machines Corporation, Armonk, N.Y.

[21] Appl. No.: 08/658,835

[22] Filed: May 31, 1996

[30] Foreign Application Priority Data

Jun. 3, 1995 [GB] United Kingdom ............... 9511234

[51] Int. Cl.$^6$ ............................................ G06F 15/00
[52] U.S. Cl. .................. 345/348; 345/326; 345/340; 345/349
[58] Field of Search ........................ 395/340, 347, 395/348, 349, 350, 352, 358; 345/326, 340, 348, 349

[56] References Cited

U.S. PATENT DOCUMENTS 5,040,131  8/1991  Torres ............................ 395/352
5,564,018  10/1996  Flores et al. ................. 395/200.02
5,577,188  11/1996  Zhu .............................. 345/326

FOREIGN PATENT DOCUMENTS 0325081  7/1989  European Pat. Off. .
0616283  9/1994  European Pat. Off. .

OTHER PUBLICATIONS

Research Disclosure Oct., No. 318, Emsworth, GB (1990) Using a Highlighter on Shared Compter Document. p. 319.
The Complete HyperCard Handbook, A Bantam Book/Oct. 1988 pp., 224–226.
ACM Trans. on Graphics, vol. 12, No. 1, Jan. 1993, pp.103–107, Salesin, D. and Barzel, R. "Adjustable Tools: An Object Oriented Interaction Metaphor".
The Complete Hypercard Handbook, 1988, Goodman, D. pp.226, line 3–line 30.
Research Disclosure, No. 336, Apr. 1992 Havant, GB, p.284 XP 000305003, RD 33668 'Value Set Control Indication' p.284, line 7–line 10.

Primary Examiner—Ba Huynh
Attorney, Agent, or Firm—David A. Mims, Jr.

[57]  ABSTRACT

A data processing system and method in which processing operations represented as icons are selectable by a user for application to subsequently selected data items. The icon representing the operation is selected and then a pointer giving a visual indication of the selected operation is moved over data items to select them and then the operation is automatically performed. This sequence of processing is more efficient than the alternative of selecting data and then selecting an operation to be performed, since the user knows what process will be applied at the time of selecting the data. Also, repeated performance of the operation to a different data set merely requires selection of the new data.

16 Claims, 17 Drawing Sheets

| Date | Midi 97-34 | Midi 92-64 | HiFi 65-52 | HiFi 87-56 | HiFi 95-62 |
|---|---|---|---|---|---|
| 940131 | 23.7 | 67.8 | 75.3 | 89.2 | 67.3 |
| 940228 | 31.6 | 56.3 | 96.3 | 75.2 | 78.4 |
| 940331 | 25.7 | 78.3 | 78.2 | 62.8 | 59.2 |
| 940430 | 68.2 | 45.3 | 95.4 | 81.5 | 67.6 |
| 940531 | 67.4 | 56.1 | 95.5 | 94.2 | 59.4 |
| 940630 | 56.3 | 78.1 | 94.5 | 95.8 | 50.4 |
| 940731 | 97.7 | 95.2 | 93.2 | 95.3 | 67.5 |
| 940831 | 89.2 | 74.3 | 83.5 | 95.8 | 51.6 |
| 940930 | 56.2 | 67.9 | 45.3 | 73.2 | 67.5 |
| 941031 | 67.2 | 83.2 | 57.4 | 93.4 | 78.6 |
| 941130 | 89.2 | 75.4 | 75.3 | 93.2 | 31.5 |
| 941231 | 45.8 | 95.4 | 83.2 | 81.9 | 69.1 |

| Date | Midi 97-34 | Midi 92-64 | HiFi 65-52 | HiFi 87-56 | HiFi 95-62 |
|---|---|---|---|---|---|
| 940131 | 23.7 | 67.8 | 75.3 | 89.2 | 67.3 |
| 940228 | 31.6 | 56.3 | 96.3 | 75.2 | 78.4 |
| 940331 | 25.7 | 78.3 | 78.2 | 62.8 | 59.2 |
| 940430 | 68.2 | 45.3 | 95.4 | 81.5 | 67.6 |
| 940531 | 67.4 | 56.1 | 95.5 | 94.2 | 59.4 |
| 940630 | 56.3 | 78.1 | 94.5 | 95.8 | 50.4 |
| 940731 | 97.7 | 95.2 | 93.2 | 95.3 | 67.5 |
| 940831 | 89.2 | 74.3 | 83.5 | 95.8 | 51.6 |
| 940930 | 56.2 | 67.9 | 45.3 | 73.2 | 67.5 |
| 941031 | 67.2 | 83.2 | 57.4 | 93.4 | 78.6 |
| 941130 | 89.2 | 75.4 | 75.3 | 93.2 | 31.5 |
| 941231 | 45.8 | 95.4 | 83.2 | 81.9 | 69.1 |

| Date | Midi 97-34 | Midi 92-64 | HiFi 65-52 | HiFi 87-56 | HiFi 95-62 |
|---|---|---|---|---|---|
| 940131 | 23.7 | 67.8 | 75.3 | 89.2 | 67.3 |
| 940228 | 31.6 | 56.3 | 96.3 | 75.2 | 78.4 |
| 940331 | 25.7 | 78.3 | 78.2 | 62.8 | 59.2 |
| 940430 | 68.2 | 45.3 | 95.4 | 81.5 | 67.6 |
| 940531 | 67.4 | 56.1 | 95.5 | 94.2 | 59.4 |
| 940630 | 56.3 | 78.1 | 94.5 | 95.8 | 50.4 |
| 940731 | 97.7 | 95.2 | 93.2 | 95.3 | 67.5 |
| 940831 | 89.2 | 74.3 | 83.5 | 95.8 | 51.6 |
| 940930 | 56.2 | 67.9 | 45.3 | 73.2 | 67.5 |
| 941031 | 67.2 | 83.2 | 57.4 | 93.4 | 78.6 |
| 941130 | 89.2 | 75.4 | 75.3 | 93.2 | 31.5 |
| 941231 | 45.8 | 95.4 | 83.2 | 81.9 | 69.1 |

FIG. 4C

| Date | Midi 97-34 | Midi 92-64 | HiFi 65-52 | HiFi 87-56 | HiFi 95-62 |
|---|---|---|---|---|---|
| 940131 | 23.7 | 67.8 Σ | 75.3 | 89.2 | 67.3 |
| 940228 | 31.6 | 56.3 | 96.3 | 75.2 | 78.4 |
| 940331 | 25.7 | 78.3 | 78.2 | 62.8 | 59.2 |
| 940430 | 68.2 | 45.3 | 95.4 | 81.5 | 67.6 |
| 940531 | 67.4 | 56.1 | 95.5 | 94.2 | 59.4 |
| 940630 | 56.3 | 78.1 | 94.5 | 95.8 | 50.4 |
| 940731 | 97.7 | 95.2 | 93.2 | 95.3 | 67.5 |
| 940831 | 89.2 | 74.3 | 83.5 | 95.8 | 51.6 |
| 940930 | 56.2 | 67.9 | 45.3 | 73.2 | 67.5 |
| 941031 | 67.2 | 83.2 | 57.4 | 93.4 | 78.6 |
| 941130 | 89.2 | 75.4 | 75.3 | 93.2 | 31.5 |
| 941231 | 45.8 | 95.4 | 83.2 | 81.9 | 69.1 |

Σ  μ  σ

| Date | Midi 97-34 | Midi 92-64 | HiFi 65-52 | HiFi 87-56 | HiFi 95-62 |
|---|---|---|---|---|---|
| 940131 | 23.7 | 57.8 | 75.3 | 89.2 | 67.3 |
| 940228 | 31.6 | 56.3 | 96.3 | 75.2 | 78.4 |
| 940331 | 25.7 | 78.3 | 78.2 | 62.8 | 59.2 |
| 940430 | 68.2 | 45.3 | 95.4 | 81.5 | 67.6 |
| 940531 | 67.4 | 56.1 | 95.5 | 94.2 | 59.4 |
| 940630 | 56.3 | 78.1 | 94.5 | 95.8 | 50.4 |
| 940731 | 97.7 | 95.2 | 93.2 | 95.3 | 67.5 |
| 940831 | 89.2 | 74.9 | 83.5 | 95.8 | 51.6 |
| 940930 | 56.2 | 67.9 | 45.3 | 73.2 | 67.5 |
| 941031 | 67.2 | 83.2 | 57.4 | 93.4 | 78.6 |
| 941130 | 89.2 | 75.4 | 75.3 | 93.2 | 31.5 |
| 941231 | 45.8 | 95.4 | 83.2 | 81.9 | 69.1 |

| Date | Midi 97-34 | Midi 92-64 | HiFi 65-52 | HiFi 87-56 | HiFi 95-62 |
|---|---|---|---|---|---|
| 940131 | 23.7 | 67.8 | 75.3 | 89.2 | 67.3 |
| 940228 | 31.6 | 56.3 | 96.3 | 75.2 | 78.4 |
| 940331 | 25.7 | 78.3 | 78.2 | 62.8 | 59.2 |
| 940430 | 68.2 | 45.3 | 95.4 | 81.5 | 67.6 |
| 940531 | 67.4 | 56.1 | 95.5 | 94.2 | 59.4 |
| 940630 | 56.3 | 78.1 | 94.5 | 95.8 | 50.4 |
| 940731 | 97.7 | 95.2 | 93.2 | 95.3 | 67.5 |
| 940831 | 89.2 | 74.3 | 83.5 | 95.8 | 51.6 |
| 940930 | 56.2 | 67.9 | 45.3 | 73.2 | 67.5 |
| 941031 | 67.2 | 83.2 | 57.4 | 93.4 | 78.6 |
| 941130 | 89.2 | 75.4 | 75.3 | 93.2 | 31.5 |
| 941231 | 45.8 | 95.4 | 83.2 | 81.9 | 69.1 |
|  |  | 873.3 |  |  |  |

μ  σ  M

| Date | Midi 97-34 | Midi 92-64 | HiFi 65-52 | HiFi 87-56 | HiFi 95-62 |
|---|---|---|---|---|---|
| 940131 | 23.7 | 67.8 | 75.3 | 89.2 | 67.3 |
| 940228 | 31.6 | 56.3 | 96.3 | 75.2 | 78.4 |
| 940331 | 25.7 | 78.3 | 78.2 | 62.8 | 59.2 |
| 940430 | 68.2 | 45.3 | 95.4 | 81.5 | 67.6 |
| 940531 | 67.4 | 56.1 | 95.5 | 94.2 | 59.4 |
| 940630 | 56.3 | 78.1 | 94.5 | 95.8 | 50.4 |
| 940731 | 97.7 | 95.2 | 93.2 | 95.3 | 67.5 |
| 940831 | 89.2 | 74.3 | 83.5 | 95.8 | 51.6 |
| 940930 | 56.2 | 67.9 | 45.3 | 73.2 | 67.5 |
| 941031 | 67.2 | 83.2 | 57.4 | 93.4 | 78.6 |
| 941130 | 89.2 | 75.4 | 75.3 | 93.2 | 31.5 |
| 941231 | 45.8 | 95.4 | 83.2 | 81.9 | 69.1 |

SYSTEM AND METHOD FOR EXECUTING FUNCTIONS ASSOCIATED WITH FUNCTION ICONS

FIELD OF THE INVENTION

The present invention relates to a data processing system for processing data represented on a display device connectable to the system, and to a method of operation of such a system.

BACKGROUND OF THE INVENTION

The data to be processed by the system may be numeric data, character data or indeed any other type of data. Further, the data can be organised either in a grid-like or tabular form, where each item of data can be identified by row and column, or alternatively in a free form layout. The tabular form is typically employed in software applications such as spreadsheets, tables, data viewers, and the like, whilst the free form layout is typical of text based applications such as word processors and editors.

Users of such applications require efficient techniques which will enable them to select a portion of the data and apply certain processing operations to the selected data. Preferably the techniques provided should be efficient, effective, and intuitive to the user.

Generally speaking the processing operations will fall into two distinct types. The first type will be referred to herein as 'interpretation' operations, these operations not resulting in the generation of any additional items of data, but rather the results of such operations being displayed by visual adaptation of some or all of the selected data items. Such interpretation operations are typically aimed at facilitating user interpretation of the data displayed, rather than calculating additional data from the data values processed by the operation. In the context of numeric data, examples of such interpretation operations include operations which identify whether each data value is above or below average, operations which identify positive and negative trends in the set of selected data values, or operations which identify the magnitude of each data value with respect to the other data values selected for processing. These operations do not generate any new items of data, but rather the results of the operations are applied by visual adaptation of the data values, eg by reordering the values (for example so that the largest is at the top and the smallest is at the bottom), or by marking the data values in an appropriate manner. In the context of character data, such an interpretation operation might be a spell-check operation, whereby the operation is applied to a selected portion of text and the result of the operation is displayed by indicating which words are not recognised by the spell check operation.

The second type of processing operations will be referred to as 'data generation' operations, which apply operations to the selected data items in order to generate some additional data. These may for example be statistical operations such as sum, arithmetic means, standard deviation, regression coefficients and the like, all of which calculate additional data based on the data selected. The new data items constituting the result of such 'data generation' operations will generally be displayed at a preselected position on the display device.

In the context of numeric data, U.S. Pat. No 5,040,131 describes a technique whereby a user can manipulate data in a table, and then select a function which displays icons corresponding to potentially valid processes that could be performed on the data in the table. The user can mark a portion of the data in the table, and then select one of the icons. Upon selection of one of the icons, the system automatically performs the operation corresponding to the selected icon for the marked data. The user may then place the result of the operation on the display screen by dragging the selected icon to the desired location on the screen.

The above prior art technique permits the user to view a collection of valid operations side-by-side with the data the user is viewing and manipulating, which enables the user to ascertain the operations that are available to be performed on the data displayed. It is an object of the present invention to provide a system which facilitates more efficient formulation of an operation to be performed by the system.

SUMMARY OF THE INVENTION

Accordingly the present invention provides a data processing system for processing data represented on a display device connectable to the system, the system comprising: input control means, responsive to signals received from an input device connectable to the system, for moving an element displayed on the display device so as to enable a user to select a set of data items represented on the display device; processing means for performing a chosen processing operation on the data items selected by the user; the system being characterised by: icon display means for representing each processing operation available to the user as an icon on the display device; selection identification means to identify a signal from the input device corresponding to a user selection of one of said icons; visual indication means for providing a visual indication on the display device of the icon selection; the input control means being arranged to control movement of the element on the screen, subsequent to an icon selection identified by the icon selection means, to enable the user to select the set of data items; the processing means being responsive to a signal indicating that the set of data items have been selected to perform the processing operation represented by the selected icon on the set of data items selected.

Viewed from a second aspect the present invention provides a method of operating a data processing system to process data represented on a display device connectable to the system, the method comprising the steps of: moving an element displayed on the display device in response to signals received from an input device connectable to the system so as to enable a user to select a set of data items represented on the display device; performing a chosen processing operation on the data items selected by the user; the method being characterised by the steps of: representing each processing operation available to the user as an icon on the display device; identifying a signal from the input device corresponding to a user selection of one of said icons, and providing a visual indication on the display device of the icon selection; controlling movement of the element on the screen, subsequent to the user selection of an icon, to enable the user to select the set of data items; responsive to a signal indicating that the set of data items has been selected, automatically performing the processing operation represented by the selected icon on the set of data items selected.

By use of the present invention, a more efficient formulation of the processing operation to be performed is possible, since at the time the user selects the set of data to be processed, the processing operation to be performed on that data is already defined. The user has a visual indication of the processing operation currently active, and so knows at the time the data is selected what process will be applied upon completion of that selection. Further, if the user wishes to apply the same processing operation to a different set of data, he/she merely has to select that data, and the processing operation is automatically applied to that new set of data without any further need for user input.

In preferred embodiments the visual indication means is arranged to adapt the element (for example the mouse pointer) to indicate the icon selection. In this way the element that is actually passed over the data that the user is selecting does itself give a visual indication to the user of the processing operation to be applied to that data.

In preferred embodiments the data is arranged by an application and represented on the display device through a graphical user interface provided by the system, the graphical user interface employing an object oriented environment, and the system further being characterised in that: each of the available processing operations is provided as an instance of a class defining the characteristics of the various types of processing operations available, each of the instances including the processing means for performing the associated processing operation; and the application is arranged to determine when an icon representing an instance of the class has been selected, and to instruct the processing means of that instance to perform the associated processing operation on the set of data items selected. In this way, the technique of the present invention is available to users of the system, irrespective of the software application being used to present and manipulate the data.

To enable software applications to use these class instances (or 'tools'), the applications must be able to interface with the tools. The manner in which this is achieved in the preferred embodiment will be discussed in detail later. The separation of the processing operation of the tool from the software application has several implications. Firstly, the algorithm only needs to be held in one place, ie in the code defining the tool, rather than being replicated across multiple software applications. Further, the same tool is used in the same way across the various software applications, thereby ensuring consistency of user interface and display of results. Also, additional tools can easily be added for use by all of the software applications.

In connection with preferred embodiments as discussed above, the visual indication means is preferably controlled by the application, the input control means being arranged to notify the application when the element is positioned within an area of the display device associated with that application, the application then invoking the visual indication means to adapt the element to indicate the icon selection.

In preferred embodiments of the present invention, at least one of the processing operations available is an interpretation operation, and the results of such an operation are displayed on the display device by associating different colouring and/or shading with the various data items to which the operation has been applied. For instance, graduated shades of a single colour may be used. This approach provides an efficient technique for displaying the results of the operation in a manner which facilitates easy interpretation by the user.

In other embodiments of the present invention, the icon selected by the user may represent a data generation operation such as a statistical processing operation, the result of such a processing operation being displayed at a predetermined position on the display device. This would typically be the case where the processing operation produced a single data value as a result. If, alternatively, the result takes the form of a chart or a list of data, these results can be displayed in a predetermined area of the display device separate from the area of the display device with which the application is associated.

In preferred embodiments, the icons displayed by the icon display means take the form of highlighter pen icons. For interpretation type processing operations, this representation has proven to be more intuitive to the user, since all business professionals are familiar with the everyday activity of interpreting a document and marking key information and exceptions with a highlighter pen. Hence this type of representation acts as a metaphor for identifying a range of values to interpret, and a type of interpretation to perform. Preferably, the visual indication means also replaces the element (eg the mouse pointer) with a representation of the highlighter pen selected by the user.

BRIEF DESCRIPTION OF THE DRAWINGS

The present invention will be described further, by way of example only, with reference to a preferred embodiment as illustrated in the accompanying drawings, in which:

FIGS. 4A to 4E illustrate the state of the display screen at various stages during the selection and performance of a data generation operation, in particular a statistical operation, using the data processing system of the preferred embodiment of the present invention.

DESCRIPTION OF THE PREFERRED EMBODIMENT

Figure 1:
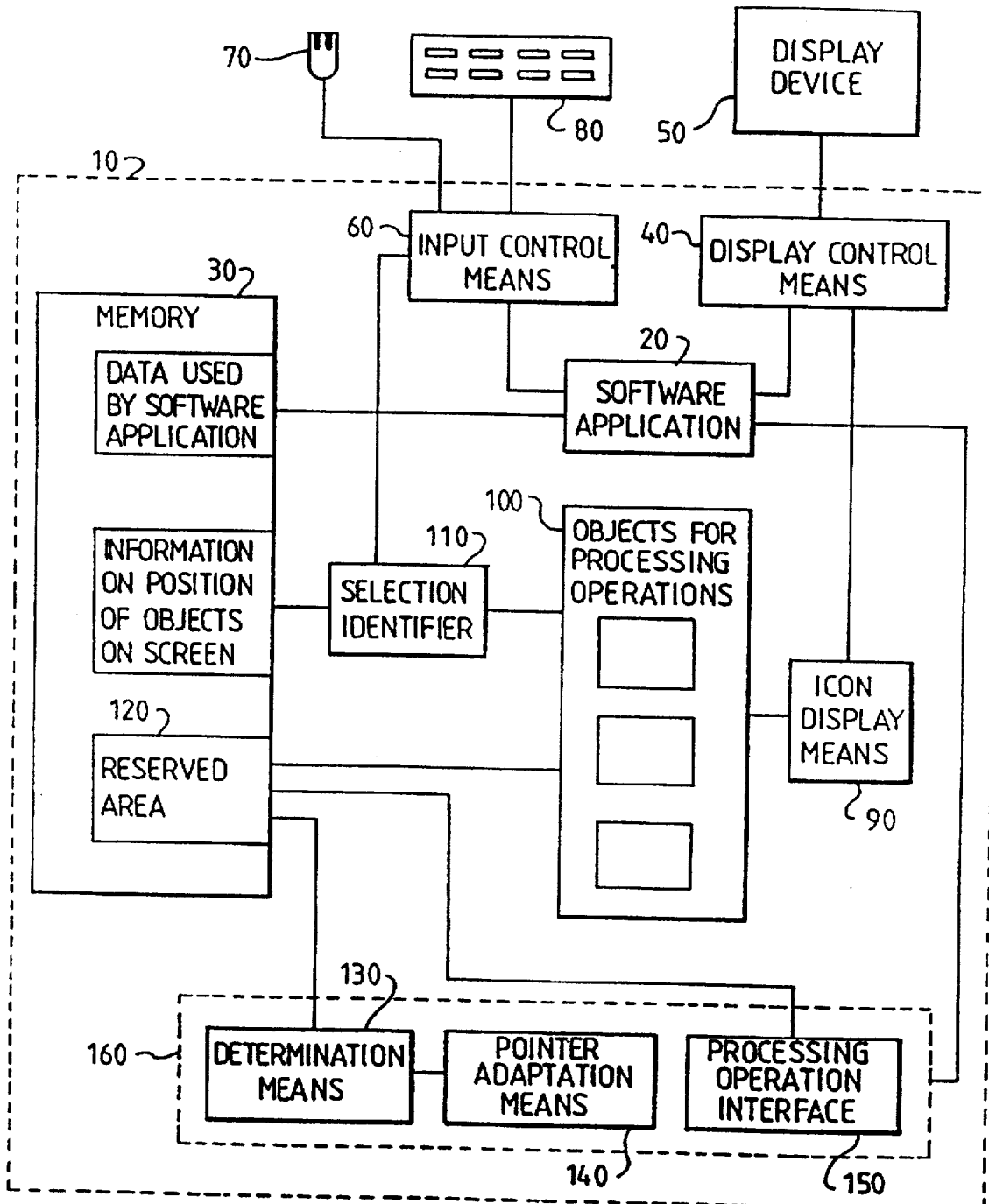
FIG. 1 is a block diagram illustrating a data processing system in accordance with the preferred embodiment of the present invention.

In the preferred embodiment of the present invention, it will be assumed that a software application is being used which employs a graphical user interface to display and interpret rows and columns of numeric values. This is typical of many of today's data processing applications, such as Management Information System (MIS) and Enterprise Information System (EIS) applications. FIG. 1 is a block diagram illustrating a data processing system in accordance with the preferred embodiment of the present invention.

As shown in FIG. 1, the data processing system 10 has a software application 20 installed therein, which is used to display data to the user on the display device 50 via the display control means 40. The operation of such display control means 40 is generally known in the art, and need not be discussed in any further detail herein. It suffices to say that it encompasses the various software and hardware components used to pass data to the display device. In the IBM OS/2 operating system, this process is initiated by the software application using a layer of OS/2 called the Presentation Manager.

As is known, once the data has been displayed the user can then interact with the software application to manipulate the displayed data as desired. The data used by the software application 20 is stored in a memory 30, it being immaterial to the present invention what type of memory is used for this purpose. For example the memory may take the form of a hard disk device within the data processing system 10, or may be an external storage device connected to the data processing system.

According to the preferred embodiment of the present invention, the data processing device 10 is provided with an input control means 60 for controlling the position of a graphical element on the display device 50 in response to signals received from input devices 70, 80 connected to the data processing system 10. Typical input devices would be a mouse 70 or a keyboard 80, their associated graphical elements being a mouse pointer or a keyboard cursor. As will be appreciated by those skilled in the art, the function of the input control means 60 is typically provided by the operating system/GUI of the system, for example the mouse driver code in the case where the input device is a mouse.

The data processing system of the preferred embodiment of the present invention also includes an icon display means 90 which causes icons to be displayed on the display device 50 representing the various processing operations which the user could perform on the data displayed by the software application. These processing operations could be provided as a set of routines within the software application itself, but in preferred embodiments the operating system/GUI provides an object oriented environment, and each of the processing operations are embodied as objects, each object being an instance of a class. This preferred embodiment will be discussed in more detail later. For the purposes of FIG. 1, the objects representing the various processing operations are indicated by block 100, this generally being an area of storage within the system where the procedures and data associated with the objects are stored. The storage 100 further includes information about the icons to be displayed to indicate each processing operation, the icon display means 90 accessing the storage 100 to determine this information prior to display of said icons on the display screen.

The location on the screen of the display device 50 where the icons are displayed is immaterial for the purposes of the present invention. They may for instance be displayed individually on the 'desktop', this being a term used to describe the background display presented by the GUI, upon which the various windows, objects, folders and other items used by the user of the system are placed. Alternatively, a set of the objects (eg all the available highlighter pen objects) can be placed in a container such as a folder, the user being able to open this container to display a window on the screen displaying icons representing the objects in the container. As will be appreciated by those skilled in the art, a container is essentially a means used in GUI environments to logically group a set of objects together.

The form of the icons displayed by the icon display means 90 will be discussed in more detail later. However, in preferred embodiments, interpretation type operations such as 'Rank' and 'Trend' will be represented by 'highlighter pen' icons of specific colours, the results of those operations being displayed to the user by associating graduated shades of the appropriate colours with the various items of data on which the operation has been performed. For data generation operations, such as statistical operations, where additional data is created as a result of the operation, the icon will take the form of a suitable graphical representation that will be symbolic of the operation.

Returning to the preferred embodiment of the present invention as illustrated in FIG. 1, the user of the system can select one of the icons displayed by the icon display means 90 using one of the input devices, for example the mouse 70. As will be appreciated by those skilled in the art, there are various ways in which an icon can be selected within a GUI, the exact mechanism used generally being dependent on the operating system. However, for completeness, this is generally achieved by moving the mouse 70 until the mouse pointer on the display screen is located over the desired icon, and then using mouse button selections and/or key strokes to select that icon.

A selection identifier 110 is provided which receives a signal from the input control means 60 indicating that a user selection has taken place. The selection identifier then accesses information in memory 30 concerning the position of the various icons on the screen. It should be noted that this memory need not be the same physical piece of memory as that in which the data used by the software application is stored. Using this information, the selection identifier 110 is able to determine whether the positional information in the signal from the input control means 60 matches the position on the display device of one of the icons, such a determination indicating user selection of that icon.

When a selection of one of the icons is detected, the selection identifier 110 sends a message to the object associated with that icon, telling that object to establish a portion of shared memory within the reserved area 120, and to store details of itself in that portion of memory. This information will later be used by the software application 20, the information defining all the attributes of the object that are relevant to the application 20. For example, this information will include a piece of data identifying the program to be run to perform the processing operation of that object. The exact information stored in shared memory will depend on the object, but as an example the following information is placed in shared memory by a Highlighter pen object:

| | |
|---|---|
| Direction | Direction to process marked data (eg top to bottom, left to right, etc) |
| HelpFile | File containing help information |
| Name | Highlighter name |
| Open | Records whether highlighter is open or shut |
| PenColour | Colour of the highlighter |
| PenHiDark | Shade light to dark or dark to light |
| PenLegend | Legend (an explanation of the shading that can be displayed to the user) |
| PenShades | Number of shades to use |
| ProgramName | Program defining associated processing operation |
| SupportChar | Records whether highlighter supports character data |
| SupportNumeric | Records whether highlighter supports numeric data |
| ToolType | Type of tool (eg Highlighter) |

If the user wants to select another object, he/she simply moves the mouse pointer over the corresponding icon displayed by the icon display means 90, and then selects that icon. The selection identifier 110 will then identify the icon selected, and send a message to the associated object as already discussed above. Any information about a previously selected object in the reserved area of memory 120 will be overwritten by the relevant information pertaining to the newly selected object.

At the time an icon is identified as having been selected, a visual indication of the icon selected is preferably displayed on the screen. For example, the icon selected may be surrounded by a shaded square to indicate its selection. Further, the form of the icon itself can be changed. For example, the icon representing a highlighter pen is in the preferred embodiment generally represented in its closed format (ie the lid covers the nib). However once the icon is selected, it is replaced by a new form of icon, in which the highlighter pen is shown open with the nib exposed.

Over and above any changes actually made to the icon, in the preferred embodiment the element associated with the input device (eg the mouse pointer) is also adapted to provide a visual indication of the icon (and hence the processing operation) selected. For example, if the mouse is used to select the highlighter pen icon representing the 'Rank' operation, then in the preferred embodiment of the invention the mouse pointer is replaced by a representation of that highlighter pen icon. Any further movement of the mouse then causes the new highlighter pen representation of the mouse pointer to be moved accordingly. By this form of representation, the user will always be aware of the operation that will be applied to any data subsequently selected using the mouse. This adaptation can be done under the control of the operating system/GUI at the time the icon is selected. However, in the preferred embodiment, this adaptation is managed by the software application in the manner described below.

Having selected the desired processing operation, the user can then move the mouse pointer around the screen under the control of the input control means 60, and will typically move the pointer so that it enters the window on the screen in which the data of the software application 20 is being displayed. Once the pointer enters the software application's window, the input control means 60 notifies the software application 20. The software application then requests a determination means 130 to check the reserved area 120 of shared memory to ascertain if an icon representing a processing operation has been selected. If it has, then as described earlier the object referenced by that icon will have stored information about itself in the reserved area of memory 120 and the determination means 130 will locate that information. Using this information, the determination means 130 will instruct a pointer adaptation means 140 to replace the element associated with the input device (eg the mouse pointer) with a suitable representation based on the information about the object in the shared memory. For example, in the preferred embodiment, if the icon selected represented a highlighter pen object, the element would be replaced by a graphical representation of that highlighter pen. Typically the colour of the highlighter pen forming the adapted element will be the same as the colour of the highlighter pen icon. The pointer adaptation means 140 makes the necessary changes to the mouse pointer, and then supplies data representing the adapted element back to the software application 20. The software application can then display that adapted element on the display device 50 through the display control means 40.

Having adapted the mouse pointer upon entering the window of the software application 20, several techniques can be applied to enable the user to select a portion of the data displayed in that window, eg a row or a column. These techniques will be readily understood by anyone who has used GUI systems. AS one example, the mouse pointer can be moved to the first item of data to be selected and the left mouse button can then be depressed. Whilst this button remains depressed, the user can move the mouse pointer on the screen, and all data values that the mouse pointer moves over will become selected.

When the desired data values have been selected the user simply takes his/her finger off the left mouse button. This de-selection of the mouse button causes the input control means 60 to send a signal to the software application 20 informing it that a set of data values have been selected. The software application 20 then automatically causes the processing operation interface 150 to instruct the processing operation identified by the currently selected object in the shared area of memory 120 to be run. The processing operation interface 150 does this by accessing the shared area of memory 120, retrieving the information identifying the program embodying the processing operation, and then executing that program.

Generally the program will be arranged to request the set of data values selected by the user from the processing operation interface 150, and will then store that data in a local portion of memory associated with that program. The program then applies the processing operation to that data, sending the results back to the processing operation interface 150. The processing operation interface 150 can then pass them back to the software application for display on the display device.

In the preferred embodiment of the present invention, if the operation selected by the user was an interpretation operation, then the icon representing it will be a highlighter pen of a specific colour, eg red. Preferably the results of the operation are then indicated to the user by shading the background behind each data value subjected to that operation with a different shade of that colour. For example if the RANK operation is represented by a blue highlighter pen icon, then the results of the operation are displayed to the user by using different shades of blue for the background behind each data value, the largest data value having the deepest blue background, and the smallest data value having the lightest blue background. Obviously there are many foreseeable variations on this theme; for example the actual data values themselves can be coloured rather than the background, different colours can be used rather than graduated shades of the same colour, etc.

If the processing operation is a data generation operation which calculates one or more new items of data as a result of the operation, eg Sum, Standard Deviation, etc, then the icon displayed by the icon display means 90 will generally not be a highlighter pen, but instead will be any other suitable icon that will indicate to the user the processing operation associated with that icon. Further, the result of the operation will be typically be displayed to the user by display of the result at a predetermined position on the display screen. Alternatively, the result may not merely be another value, but could for instance be a chart or a list of results. In such cases, the result can be displayed in a separate area of the display screen not associated with the software application. For example, the processing operation might set up a special purpose window in which to display the results of the operation.

Returning to the FIG. 1 illustration, the determination means 130, pointer adaptation means 140, and processing operation interface 150 can be implemented as software routines operating under the control of the software application. However, in preferred embodiments of the present invention, their functions are embodied by procedures of an object class used by the software application 20. This object class includes all the necessary procedures and data required by a software application to facilitate its use with the objects stored in storage 100, and is represented in FIG. 1 by the dotted box 160. The general form of this object class will be discussed in more detail later.

With reference to the above description of the data processing system 10, it should be noted that the various processing operations could be implemented within each particular software application 20 used by the system.

However, in such instances the above described technique for selecting and executing a processing operation can only be used in connection with that specific software application. Hence, in preferred embodiments, as already mentioned earlier, the processing operations are implemented as independent software objects, or 'tools', which can be installed on the data processing system 10.

Many of today's GUIs, for example IBM's OS/2 operating system, employ an object oriented user interface (OO UI), with the various features such as folders, shredders, printers, etc being represented by objects. In IBM OS/2, the OO UI is provided by the 'OS/2 Workplace Shell'. The aim of such OO UIs is to make software applications easier to use by representing things handled by the application as icons on the desktop. The user can use an input device such as a mouse to create, copy, move, change, delete, print, etc the things that the icons represent. The preferred embodiment exploits the OO UI approach to display icons representing highlighter objects and other tools that can be selected by the user.

Further, the preferred embodiment of the present invention exploits object oriented programming (OOP) techniques, for example to provide the functionality that enables software applications to use the tools provided by the preferred embodiment. OO programming is designed to make software easier to develop and maintain by packaging data and processing required by many applications as classes. It is a particular approach to software development which implements required functions by way of 'messages' sent to 'objects' (each object being an 'Instance' of a 'Class'). An instance of a class is a software package that contains a collection of related procedures (often called 'methods') and data pertaining to that instance (often referred to as 'variables').

As an example, a bank might create a class to represent a bank account, with instance data to define the account number and balance, and methods to deposit and withdraw money and query the balance. Other classes could also be developed, a set of related classes typically being organised as a class library. Programmers writing code to manipulate accounts would use the bank account class rather than individually developing code to define and manipulate accounts. Instances of the class would be created, and the required processing would take place by way of messages sent to those instances. A message is a notification issued to a instance of a class informing it that some event has occurred or requesting it to take some action or both. Instances may issue messages to other instances, and the message based environment (eg the IBM OS/2 operating system) that the objects exist in may also issue messages to its objects.

The preferred embodiment exploits OO programming by providing a class library to simplify the development of: a) software applications enabled for highlighters and related tools; and b) the programming required to provide the processing means for specific instances of tools, for example a Rank Highlighter pen.

Having given an outline above of the object oriented approach used in the preferred embodiment, the preferred embodiment will now be described in more detail below.

The various processing operations to be provided by tools, eg the various highlighter pen tools, are implemented as instances of a class, and provided to the software applications in the form of a class library. To create a Highlighter UI class to define the features of Highlighter tools, a program would be written using facilities provided by the operating system to create a U object having the following capabilities:

a. Display itself as an icon representing a highlighter on the desktop or within a container. In OS/2, this could be achieved by creating a Workplace Shell object derived from the standard UI class WPAbstract and by overriding Workplace Shell methods to define a class type and icon.

b. Support entry and storage of settings (eg name, colour, program defining processing) that define a specific instance of UI class Highlighter. In OS/2, this could be achieved by using Workplace Shell methods to define settings pages for the object and store the settings as instance data.

c. Respond to its selection by adapting the icon to represent an open highlighter and placing the settings in shared storage. In OS/2 this could be achieved by overriding the Workplace Shell method responsible for opening the object.

Once the Highlighter UI class has been created, instances of that class can readily be created. The following description provides an example of the actions required by a user to create a new instance of UI class 'Highlighter':

1. Copy and name an existing instance of UI class Highlighter. Alternatively a template (ie a master copy of the class) can be used rather than an existing instance, the instance being created from the template by copying and renaming.

2. Use the object settings to define the following properties:
   a. Colour
   b. Number of shades
   c. Shade light to dark or dark to light
   d. Legend
   e. Name of program implementing associated processing means
   f. Name of associated help file
   g. Types of data supported
   h. Direction for processing blocks of data The most important settings to be defined for each new instance of the class are those mentioned at points (a), (b) and (e) above. when an icon representing an instance of the UI class Highlighter is selected for use, the following stages are involved in implementing the processing means associated with that instance:

1. Read the plurality of data items selected by the user of a suitably enabled software application.

2. Perform a set of calculations on those data items. The nature of these calculations is determined by the purpose of the highlighter. For example, an Average highlighter might total the data items, divide the total by the number of items to calculate the mean, and compare each data item to the mean.

3. Return a calculated result corresponding to each of the data items read in step 1. In the case of a Highlighter pen object, these results would typically represent different colours and/or shades of colours.

4. Optionally, display additional data, eg a chart, in a window.

Steps 1. and 3. can be achieved by using a C++ class (which we will call herein 'XIHighlighterClient') that represents the data marked by the user in the enabled software application, whilst steps 2 and 4 are clearly the responsibility of the implementor since only he/she will know what calculation any particular instance of a Highlighter is to perform, and what additional data, if any, is to be displayed.

The class 'XIHighlighterClient' has methods for reading values from the marked data and returning results. Table 1 below illustrates the methods to be included in the XIHighlighterClient class:

TABLE 1

XIHighlighterClient Class
Class: XIHighlighterClient
Class XIHighlighterClient is used to implement the processing means for a highlighter pen

| Methods | Description |
| --- | --- |
| memberCount | Returns the number of individual members in the marked data - a member can be a row, column, or block |
| memberValueCount | Returns the number of values in the selected member |
| setShade | Returns a shade calculated for a value in the selected member |
| useMember | Selects a member of the marked data to work with |
| value | Gets a value from the selected member |

Having discussed above how to create a Highlighter UI Class, and the C++ class used in preferred embodiments to implement the processing means associated with instances of the Highlighter UI class, we will now describe how, in preferred embodiments, a software application is adapted to enable it to interact with these Highlighter tools.

Programming to perform the following steps is required to enable a software application to be able to interact with tools such as the highlighter pens:
1. Test for the presence of an open highlighter.
2. Adapt the pointer to represent that highlighter.
3. Adapt the pointer to show a marking operation in progress.
4. Use the colour associated with that highlighter in place of the default mark colour.
5. Pass marked values to the open highlighter.
6. Instruct the highlighter to process the passed values.
7. Retrieve the results calculated by the highlighter.
8. Display the results calculated by the highlighter, for example by applying graduated shades or colours to the marked values or by displaying generated data.

Steps 1 to 7 can be achieved by using a C++ class that represents the open highlighter, this class being referred to herein as XIHighlighter. Step 8 will be performed by the software application based on the results passed back to it at step 7. The class XIHighlighter provides methods that can be called at appropriate points in the processing of the software application. A table illustrating the methods to be included in the XIHighlighter class is given below:

TABLE 2

XIHighlighter Class
Class: XIHighlighter
Class XIHighlighter is used by software applications to enable the use of Highlighter pens

| Methods | Description |
| --- | --- |
| addValue | Adds a value from the software application to be processed by the highlighter pen |
| allowMark | Allows marking by highlighter at this position |
| color | Returns the marking color for the current highlighter |
| disallowMark | Disallows marking by highlighter at this position |
| endMark | Tells the highlighter that a marking operation has been completed |
| getShade | Returns a shade calculated by the highlighter pen to the software application |
| isOpen | Notifies the software application that a highlighter is open |

TABLE 2-continued

XIHighlighter Class
Class: XIHighlighter
Class XIHighlighter is used by software applications to enable the use of Highlighter pens

| Methods | Description |
| --- | --- |
| legend | Returns the legend for the current highlighter |
| title | Returns the title for the current highlighter |
| process | Executes the processing means associated with the highlighter pen in order to process marked data |
| setPointer | Sets the mouse pointer to an open or shut highlighter or the default mouse pointer |
| startMark | Tells the highlighter that a marking operation has been started |

TABLE 2: XIHighlighter Class

Having provided the class XIHighlighter, the following changes are required to a software application to enable it to use the XIHighlighter class:
1. Update the section of code responsible for marking and selecting data as follows:
   a. call method 'isopen' to check if a highlighter is open.
   b. If open . . .
      i. call method 'color' to establish the colour for the open highlighter and use this in place of the default marking colour.
      ii. before starting mark operation, call method 'startMark'.
      iii. on completion of mark, call method 'endmark', call method 'addvalue' for each marked data item, and call method 'process'.
   c. when notified by the highlighter that results are available:
      i. call method 'getshade' for each marked data item.
      ii. apply the shade or colour returned by 'getshade' to adapt the background colour of each marked data item.
2. Update the section of code responsible for handling mouse movements as follows:
   a. call method 'is Open' to check if a highlighter is open
   b. if open, call method 'allow Mark' or 'disAllowMark' to notify the highlighter whether or not marking is allowed at the current position.
3. Update the section of code responsible for changing the mouse pointer as follows:
   a. call method 'isOpen' to check if a highlighter is open
   b. if open, call method 'setpointer' to adapt the mouse pointer In preferred embodiments, as already mentioned above, the C++ classes used to implement an instance of UI class Highlighter and an enabled software application are provided as a class library. By use of the above described techniques, the tools can then be used in connection with any number of software applications installed on the system once the software applications have been enabled to interact with such tools. In preferred embodiments the software applications are enabled to interact with the tools by providing a class library with all the necessary functionality, and then merely adapting certain parts of the software application so that is utilises the functions defined in this class library.

Having discussed the data processing system of the preferred embodiment with reference to FIG. 1, a description of the processing steps performed by the system will now be given with reference to FIG. 2.

Figure 2:
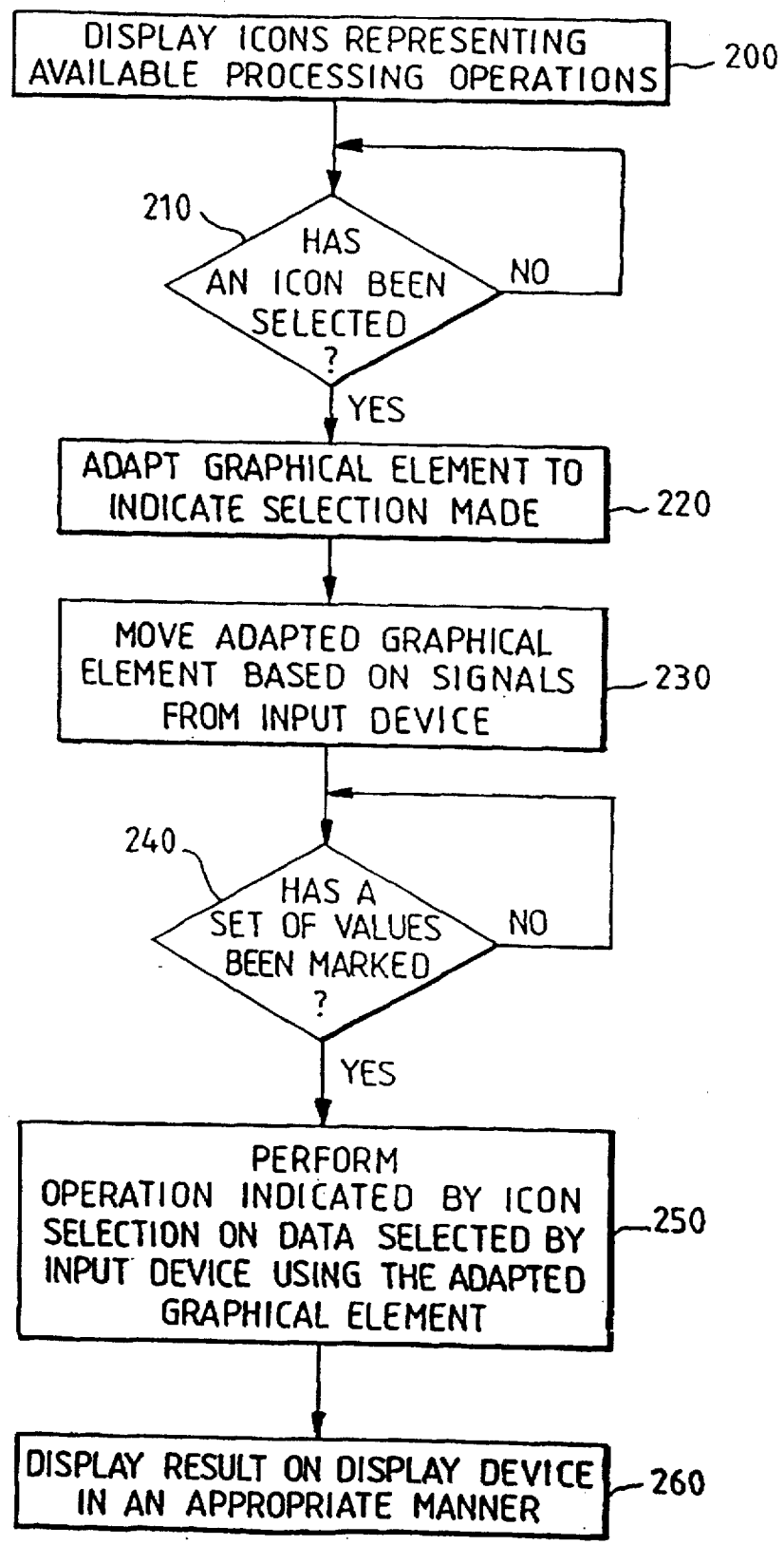
FIG. 2 is a flow diagram illustrating the processing steps performed by the system of the preferred embodiment of the present invention.

FIG. 2 is a flow diagram illustrating how the data processing system is used to formulate and execute a processing operation according to the preferred embodiment. At step 200, icons representing the available processing operations that can be employed by the user are displayed on the display device 50 by the icon display means 90. Preferably these icons will be displayed in a window associated with a folder containing icons for all the available processing operations.

The user can then select one of those icons using, for example, the mouse 70 to position the mouse pointer over the desired icon. At step 210, a determination is made as to whether an icon has been selected. If not the process loops back through step 210 until such time as an icon has been selected. Once an icon has been selected, the next stage of the process is to replace the mouse pointer (at step 220) by a graphical element which indicates which icon, and hence which processing operation, the user had selected. Preferably this is done by replacing the mouse pointer with a graphical element similar or identical to the icon selected. For example, if the processing operation chosen was a TREND operation represented by a yellow highlighter pen, the mouse cursor would preferably be replaced by a yellow highlighter pen representation. As regards exactly when this adaptation is performed, it can occur as soon as the icon has been selected. However, in preferred embodiments, the adaptation is performed by the pointer adaptation means 140 under control of the software application 20 when the pointer is moved into the window associated with the software application 20.

Further movement of the mouse within this software application window causes this new graphical element to be moved on the screen in the same manner as a conventional mouse pointer, as is indicated by process step 230. The user can thus move the graphical element to the beginning of a set of data values that he/she wishes to select for processing, indicate that a selection is to be made, eg by depressing the left mouse button, and then move the graphical element over the data values of interest to effect the selection. This would be done in the conventional manner used in GUI systems to mark areas of interest. Typically the values selected will be indicated by replacing the default background colour behind the selected data values with another colour. When using a mouse, typically the left mouse button will remain depressed during the entire selection of the data values, the user removing his/her finger from the left mouse button once the selection has been made. However other techniques for selecting the set of data values will be apparent to those skilled in the art, and for the purposes of the present invention it is irrelevant which technique is used. Preferably the software application will use identical techniques for selecting data values to pass to a tool as it would use for a normal data selection.

At step 240, it is determined whether a set of values has been marked. In the preferred embodiment, the input control means 60 receives a signal indicating that the selection has been made, for example a signal indicating that the user has removed his/her finger from the left mouse button. If a set of values have not been marked the process loops back through step 240 until such time as a selection has been made.

Once it has been determined that a selection has been made, then at step 250, the software application causes the processing operation to be performed on the data selected. The processing operation to be applied will be apparent to the user, since the form of the mouse pointer used to select the data will give a visual indication of that processing operation. In the preferred embodiment, the processing operation will be started by the application executing the program implementing that processing operation.

Once the processing operation has been completed the results are displayed on the display device 50 in an appropriate manner (step 260). For instance, with an interpretation operation such as the TREND operation, the results will in preferred embodiments be displayed by graduated shading of the data values. However, in other instances, such as where data generation operation is used, the result may be displayed as a new data value positioned at a predefined location on the screen. Alternatively the processing operation may be of the type where a chart is created based on the selected data, this chart being displayed in a window on the display screen.

For data generation operations, there may be an additional input required from the user by the program embodying the processing operation to identify where the result of the processing operation is to be displayed, eg the position on the screen or the area of the display screen. Alternatively, the program embodying the processing operation may include logic to determine where to place the result, eg a SUM operation may be arranged to display the result at the bottom of a column of data selected, or to the right of a row of data selected.

The technique of the preferred embodiment will now be discussed further with reference to the state of the display screen as viewed by the user during the various stages of the process; reference will be made to FIGS. 3A to 3E, 4A to 4E, and 5A to 5E.

In the FIG. 3 examples, the data processing system includes a collection of processing objects which are represented to the user in the form of a set of highlighter pen icons displayed on the screen. As mentioned earlier, these pen icons may be placed on the 'desktop', or alternatively the set of icons can be placed in a container, and displayed ion a window on the screen. In FIG. 3A, the set of icons are placed on the desktop itself.

Figure 3A:
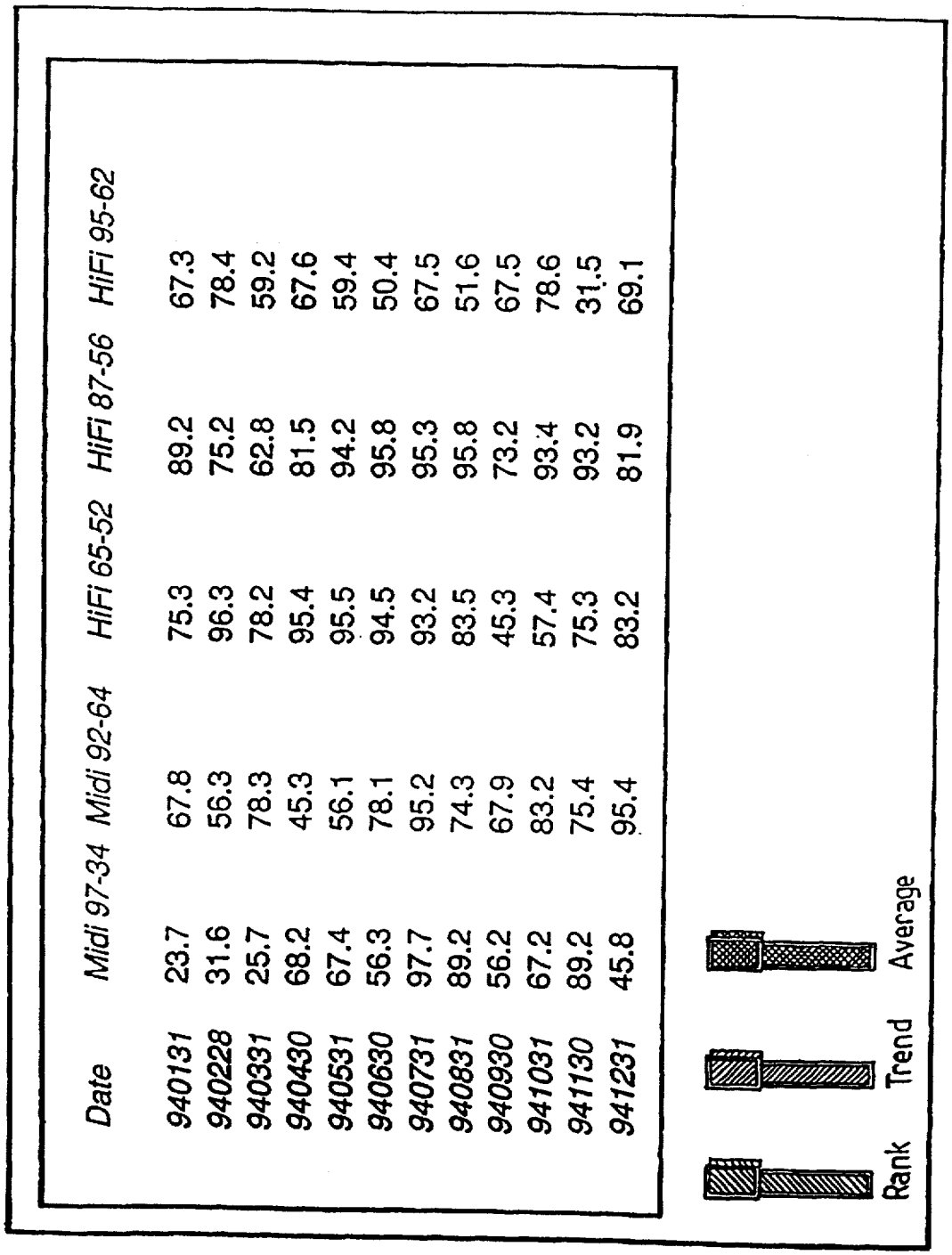
FIGS. 3A to 3E illustrate the state of the display screen at various stages during the selection and performance of an interpretation operation using the data processing system of the preferred embodiment of the present invention.

As can be seen from FIG. 3A, the icons representing each highlighter object take the form of highlighter pens of distinct colours, which are labelled to represent an interpretation operation such as RANK, TREND, or AVERAGE. The function of these interpretation operations is as follows.
RANK: A Rank pen is used to highlight the rank of each individual value in the marked values. For example, if the Rank pen is blue, it could be arranged to highlight the highest values using a dark blue background, the lowest values using a light blue background, and intermediate values using backgrounds in graduated shades of blue. One way of implementing this type of operation could be by use of a percentile highlighter pen, which places the data values into bands. For example each band could represent ten percent of the total spread of the values, the darkest colour being used to identify the highest 10 percent of the values, the lightest colour being used to identify the lowest 10 percent of the values, and intermediate shades being used to identify the other 10 percent bands.
TREND: A Trend pen is used to highlight the difference between each value and the previous value. For example, if the Trend pen is pink, it could be arranged to highlight a positive trend using a dark pink background and a negative trend using a light pink background. Values which are equal, or nearly equal to the previous value could be shown using a medium pink background. Alternatively different colours could be used, for example green for positive trend, red for negative trend, and yellow for +/−10 percent.
AVERAGE: An Average pen is used to highlight values which are above and below average for the marked values.

For example, if the Average pen was turquoise, it could be arranged to highlight values above the average of the selected values by using a dark turquoise background and below average values by using a light turquoise background. Values which are equal to the average could then be shown using a medium turquoise background. In other examples, graduated shades might be used to represent the size of the difference from the average.

Figure 3B:
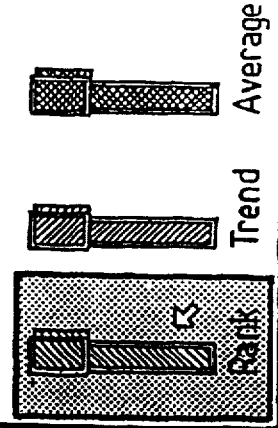

As shown in FIG. 3B, to interpret the data displayed, the user would select the highlighter pen representing the desired interpretation operation by using an input device such as a mouse. In FIG. 3B, the selection is made by positioning the mouse cursor over the desired icon, and pressing the left mouse button to indicate the selection. Then once the mouse pointer is moved into the window associated with the application 20, the mouse pointer is modified to represent the processing operation chosen.

Figure 3C:
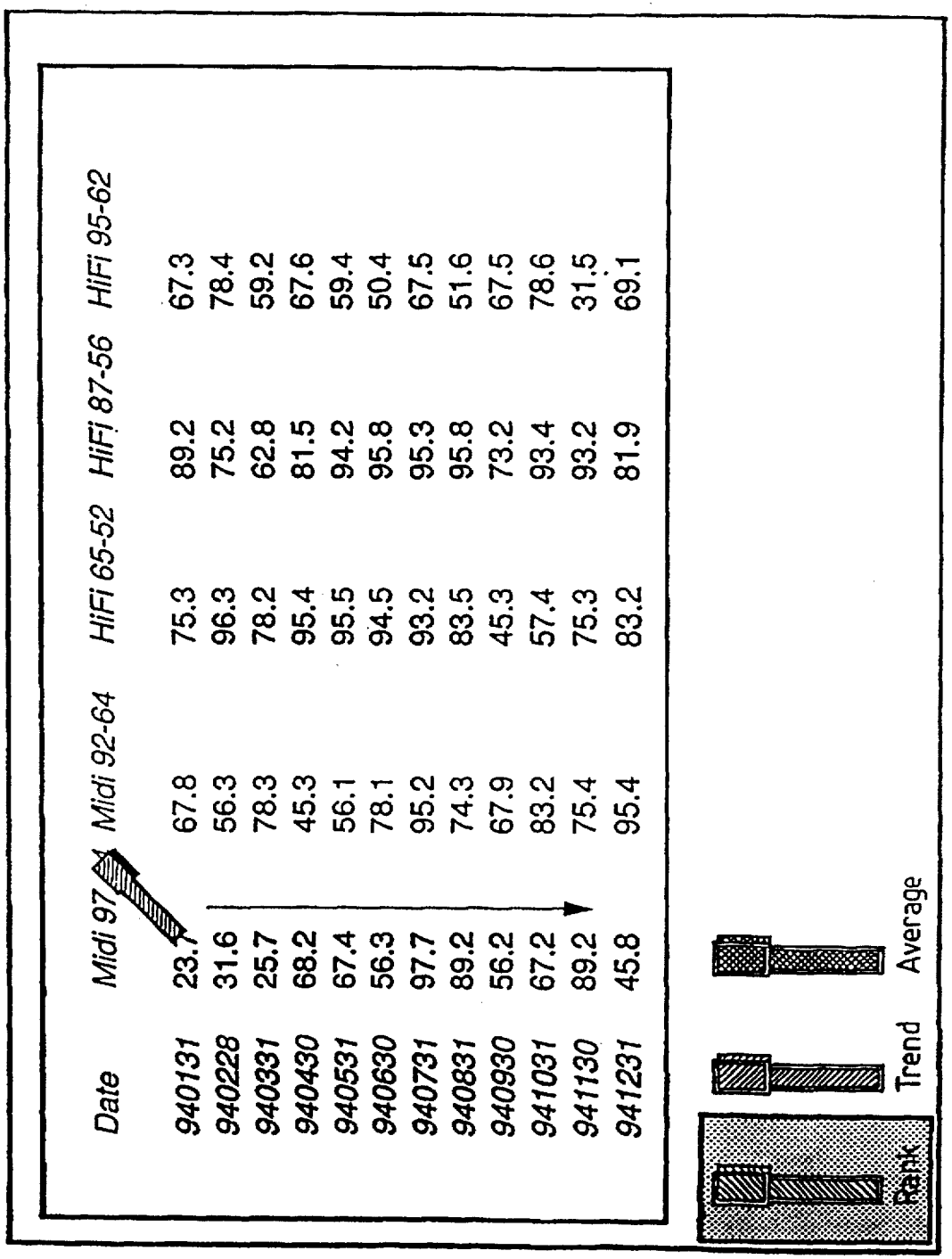

As shown in FIG. 3C, the cursor is replaced by a highlighter pen representation, this generally corresponding in colour to that of the highlighter icon chosen, in this case the RANK highlighter pen icon. The adapted cursor is then moved over the data values which the user wishes to select. With a mouse, the left mouse button would typically be depressed during this data value selection stage. Further in preferred embodiments, the pointer is again modified during the actual selection of the data values by replacing the closed highlighter pen representation with a highlighter pen representation wherein the nib of the pen is exposed, this indicating to the user that the pen is actually in use.

Figure 3D:
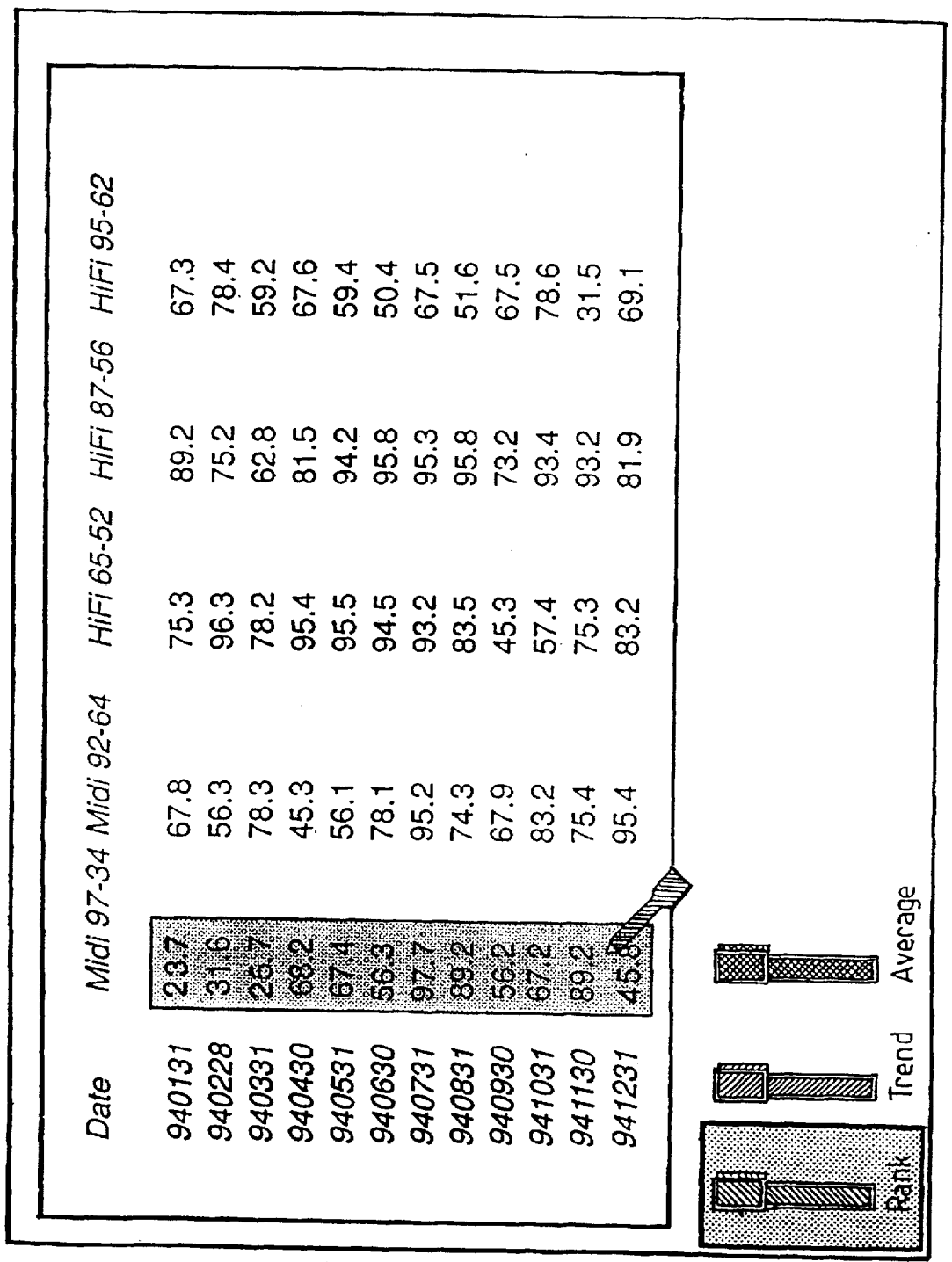
Figure 3E:
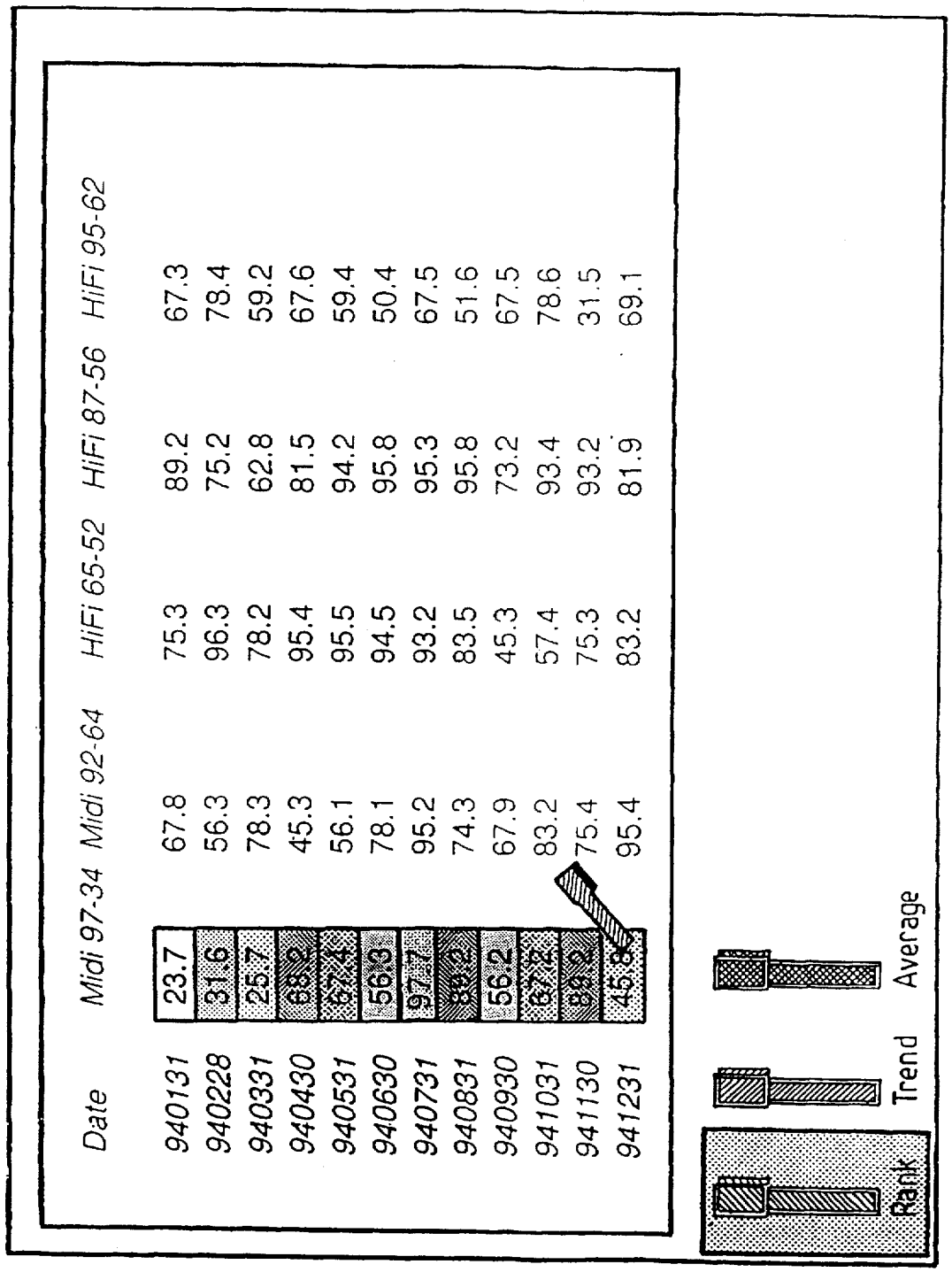

FIG. 3D shows the state of the screen at the point the user has completed the selection of data values. The background behind the values selected is preferably altered to the colour of the highlighter pen so as to indicate to the user the values selected. Once the selection has been made, the processing operation of the highlighter pen object is executed to perform the necessary processing of the data values. Then, as shown in FIG. 3E, the results of that operation are displayed to the user by graduated shading of the background behind the data values. In preferred embodiments, graduated shades of the colour associated with the selected highlighter pen are used. In preferred embodiments, a facility could be provided to allow the user to choose the number of graduated shades used to display the results. Additionally multi-colour pens could be provided which employ different colours rather than graduated shades of one colour.

If the user selects a range of values within a single row or column, the highlighting is calculated with reference to each selected value in that row or column. If the user selects a range of values in more than one row or column, a parameter associated with the processing operation can be altered to determine whether the highlights are determined by row, by column or through the whole of the data.

Depending on the behaviour of the software application 20, the selecting of a row or column title can be deemed equivalent to selecting all values in that row or column. As mentioned earlier, the application should preferably offer the same facilities for marking data whether or not a highlighter pen is being used.

Figure 4B:
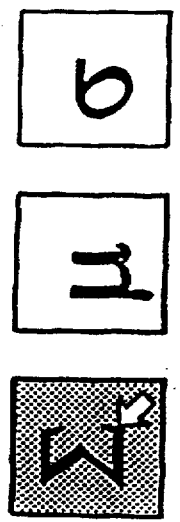
Figure 5A:
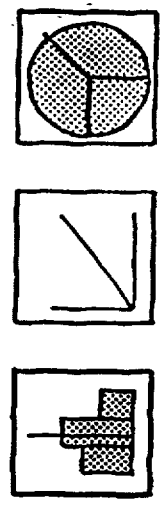
FIGS. 5A to 5E illustrate the state of the display screen at various stages during the selection and performance of a data generation operation, in particular an operation of the type which creates a chart, using the data processing system of the preferred embodiment of the present invention.
Figure 5B:
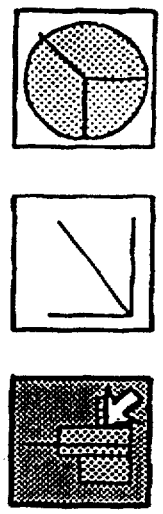
Figure 5C:
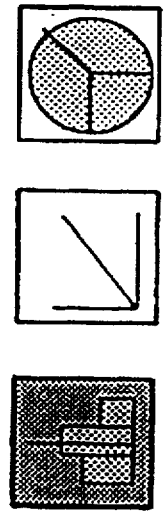
Figure 5D:
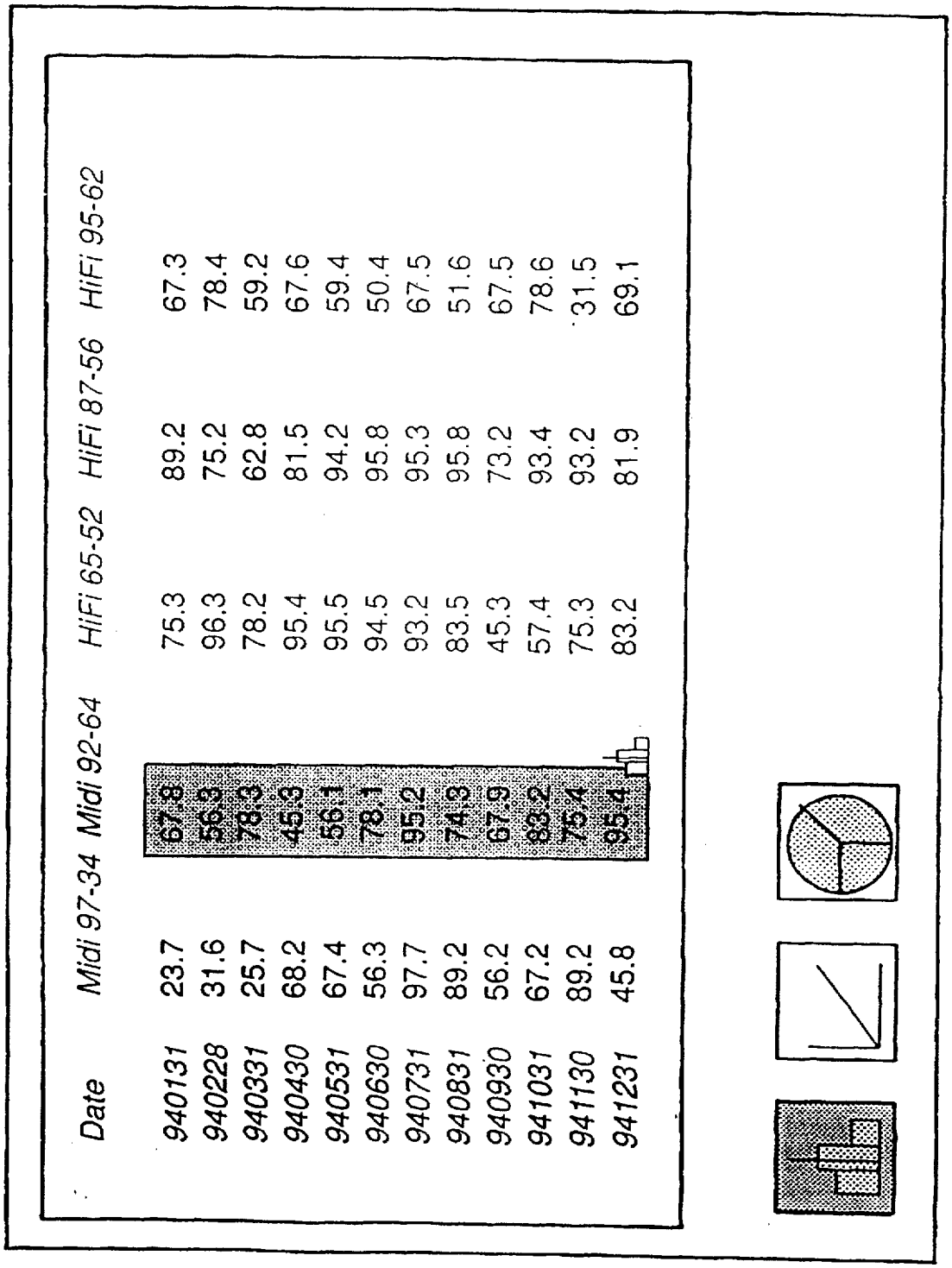
Figure 5E:
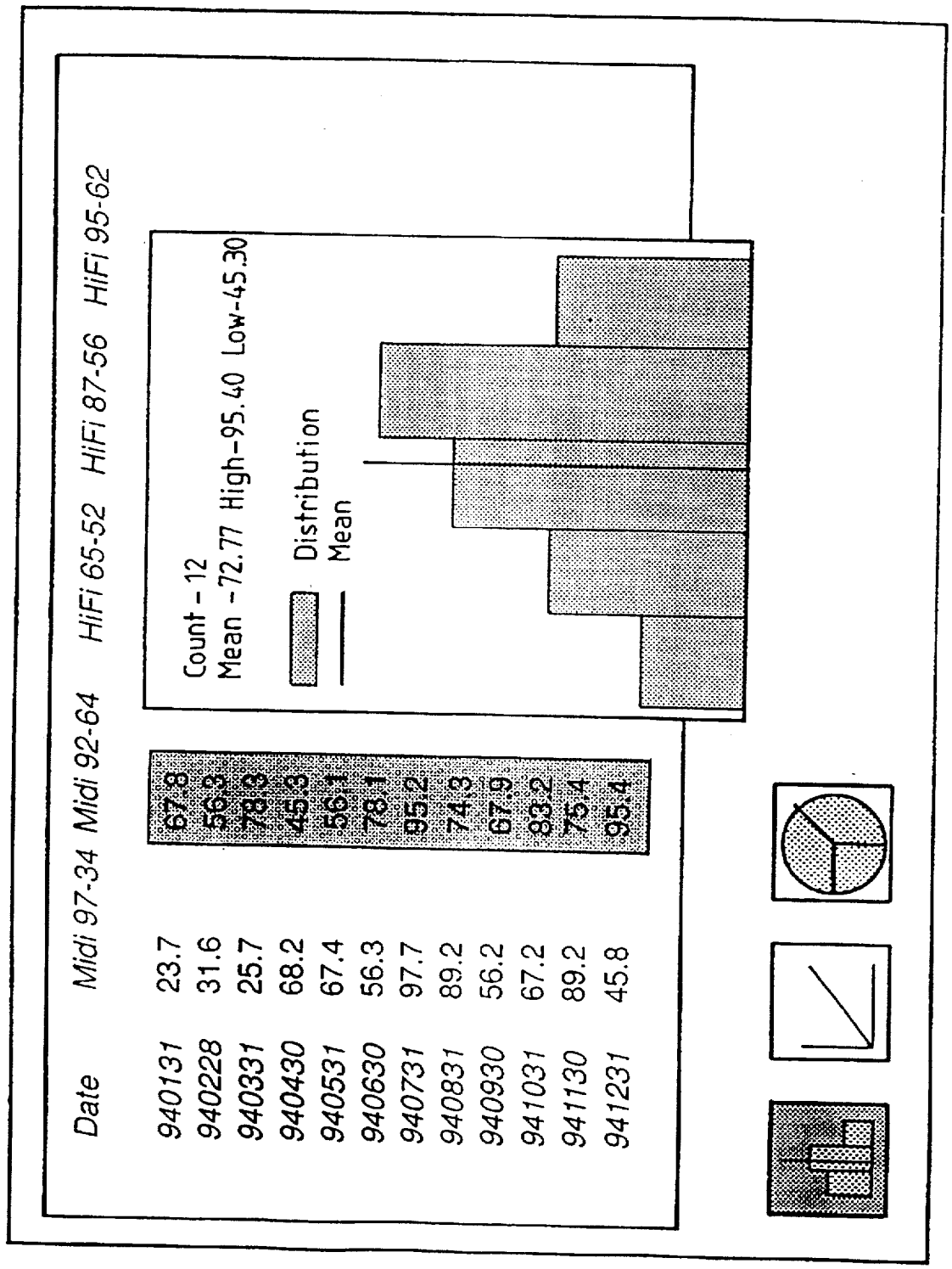

FIGS. 4A to 4E are similar to FIGS. 3A to 3E but show the use of a data generation operation rather than an interpretation operation. In the particular example, a processing object for performing a SUM operation has been selected by selection of an associated icon displayed to the user (see FIG. 4B). As shown in FIGS. 4C and 4D, the data values are selected in the same manner as discussed earlier in relation to the FIG. 3 example. However, as shown in FIG. 4E the result of the operation is displayed by a separate data value at an appropriate location on the screen, rather than by use of colours and shading.

It is worth noting that the data generation operations contemplated may not produce just one item of data. For instance, an object could be created to create a chart based on data values selected. Such a chart would preferably be displayed in a window positioned at a suitable location on the display. This type of processing operation is illustrated further with reference to FIGS. 5A to 5E, which show the state of the display screen at equivalent stages in the process to those illustrated in FIGS. 4A to 4E. In the FIG. 5 example, a distribution chart is produced as the result of the processing operation.

From the above description of the preferred embodiment, it is clear that a system according to the preferred embodiment provides an efficient, effective, and intuitive technique to allow users of a software application to select a processing operation and a range of values to operate on.

What is claimed is:

1. A data processing system for processing data represented on a display device connectable to the system, the system comprising:

input control means, responsive to signals received from an input device connectable to the system, for moving an element displayed on the display device so as to enable a user to select a set of data items represented on the display device;

processing means for performing a chosen processing operation on the data items selected by the user;

the system being characterised by:

icon display means for representing processing operations available to the user as icons on the display device;

selection identification means for identifying a signal from the input device corresponding to a user selection of one of said icons;

visual indication means for providing a visual indication on the display device of the icon selection;

the input control means being arranged to control movement of the element on the screen, subsequent to an icon selection identified by the selection identification means, to enable the user to select the set of data items;

wherein the system employs an object oriented environment, and each of said available processing operations is provided as an instance of an object class defining the characteristics of a type of processing operation, said object instances being selectable for use in association with any of a plurality of application programs which manage data items represented on the display device, and said object instances, when selected, being responsive to a signal indicating the selection of a set of data items managed by one of said application programs to perform their operations on the selected set of data items using the processing means; and wherein at least one of the processing operations is an interpretation operation for performing analysis of the selected set of application data items to generate an analysis result representing interpretative colouring and/or shading for each of the data items, and for causing the application program to display the interpretative colouring and/or shading in association with the selected data items.

2. A data processing system as claimed in claim 1, wherein the visual indication means is arranged to adapt the element to indicate the icon selection.

3. A data processing system as claimed in claim 1, wherein the visual indication means is controlled by the application, the input control means being arranged to notify the application when the element is positioned within an area of the display device associated with that application, the application then invoking the visual indication means to adapt the element to indicate the icon selection.

4. A data processing system as claimed in claim 1, wherein the results are displayed on the display device using graduated shades of the same colour.

5. A data processing system as claimed in claim 1, wherein at least one of the processing operations available is a data generation operation, and the results of such a processing operation are displayed at a predetermined position on the display device.

6. A data processing system as claimed in claim 1, wherein at least one of the processing operations available is a data generation operation, and the results of such a processing operation are displayed in a predetermined area of the display device separate from the area of the display device with which the application is associated.

7. A data processing system as claimed in claim 1, wherein the icons displayed by the icon display means take the form of highlighter pen icons.

8. A data processing system as claimed in claim 7, wherein the visual indication means replaces the element with a representation of the highlighter pen icon selected by the user.

9. A method of operating a data processing system to process data represented on a display device connectable to the system, the method comprising the steps of:

moving an element displayed on the display device in response to signals received from an input device connectable to the system so as to enable a user to select a set of data items represented on the display device;

performing a chosen processing operation on the data items selected by the user;

the method being characterised by the steps of:

providing processing operations as instances of object classes which classes each define the characteristics of a type of processing operation, said object instances being selectable for use in association with any of a plurality of application programs which manage data items represented on the display device;

representing said processing operations available to the user as icons on the display device;

identifying a signal from the input device corresponding to a user selection of one of said icons, and providing a visual indication on the display device of the icon selection;

controlling movement of the element on the screen, subsequent to the user selection of an icon, to enable the user to select a set of data items from the data items managed by any one of said plurality of application programs;

responsive to a signal indicating the selection of a set of data items, automatically performing the processing operation represented by the selected icon on the set of data items selected;

wherein at least one of the processing operations is an interpretation operation for performing analysis of the selected set of application data items to generate an analysis result representing interpretative colouring and/or shading for each of the data items, and for causing the application program to display the interpretative colouring and/or shading in association with the selected data items.

10. A method as claimed in claim 9, wherein the step of providing a visual indication includes the step of adapting the displayed element to indicate the icon selection.

11. A method as claimed in claim 9, wherein at least one of the processing operations available is an interpretation operation, and the results of such an operation are displayed on the display device by associating graduated shades of the same colour with the various data items to which the operation has been applied.

12. A method as claimed in claim 9, wherein the results of said interpretation operation are displayed on the display device by associating graduated shades of the same colour with the various data items to which the operation has been applied.

13. A method as claimed in claim 9, wherein the icons displayed by the icon display means take the form of highlighter pen icons, and the step of providing a visual indication includes the step of replacing the element with a representation of the highlighter pen icon selected by the user.

14. A method as claimed in claim 9, including the step of adapting each of said application programs to perform the following steps in response to selection of an operation object instance and subsequent selection of a set of data items managed by said application program:

to pass the selected data items to the selected operation object instance;

to instruct the object instance to perform its operation on the passed data items;

to retrieve the results of the processing; and to display the results of the processing.

15. A set of tools for processing data within an object oriented processing environment, for use in a data processing system having a connected display device for displaying data, input control means responsive to signals received from an input device connected to the system for moving an element displayed on the display device so as to enable a user to select a set of data items represented on the display device, and processing means for performing a chosen processing operation on the data items selected by the user, the set of tools comprising one or more object classes each defining the characteristics of a type of processing operation and including, as instances of the classes, objects representing specific data processing operations, each of said operations being selectable, by user interaction with an iconic representation of the respective object instance displayed on the display device, for use in association with any of a plurality of application programs, said objects being responsive to their selection and subsequent selection using said input device of a set of data items managed by one of said application programs to perform the respective processing operation on the selected set of data items; wherein at least one of the processing operations is an interpretation operation for performing analysis of the selected set of application data items to generate an analysis result representing interpretative colouring and/or shading for each of the data items, and for causing the application program to display the interpretative colouring and/or shading in association with the selected data items.

16. An application program adapted to interoperate with a set of tools according to claim 15, wherein said application program is adapted to perform the following steps in response to selection of an operation and subsequent selection of a set of data items managed by the application program:

to pass the selected set of data items to the selected operation object instance;

to instruct the selected object instance to perform its operation on the passed data values;

to retrieve the results of the processing; and to display the results of the processing.

* * * * *